Aug. 30, 1932.  G. WHEAT  1,874,725
STORAGE BATTERY
Filed Dec. 5, 1927  2 Sheets-Sheet 1
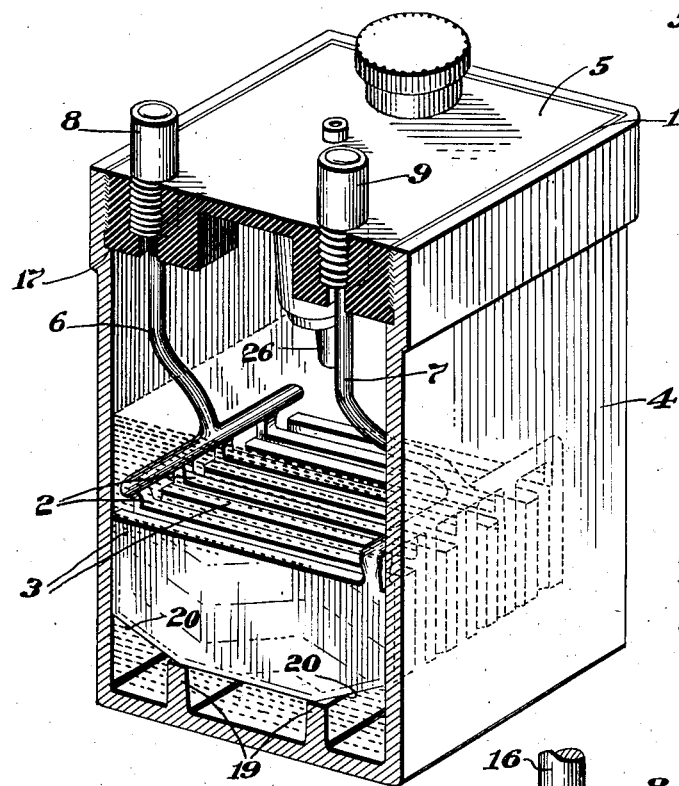
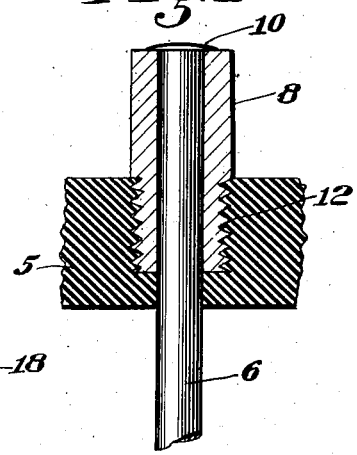
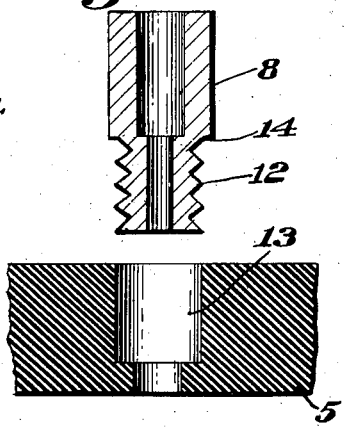
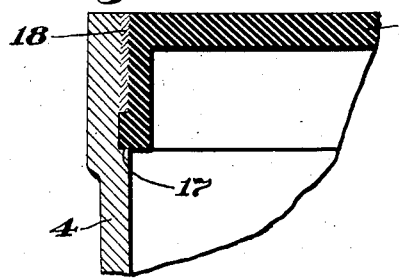
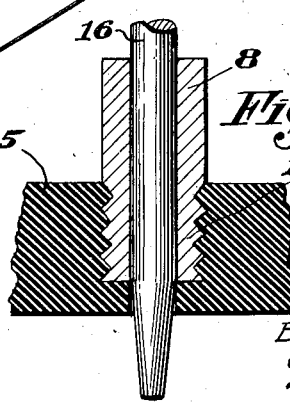
INVENTOR:
Grant Wheat,
BY
ATTORNEY Aug. 30, 1932.  G. WHEAT  1,874,725
STORAGE BATTERY
Filed Dec. 5, 1927   2 Sheets-Sheet 2

INVENTOR.
Grant Wheat,
BY
ATTORNEY

Patented Aug. 30, 1932

1,874,725

UNITED STATES PATENT OFFICE

GRANT WHEAT, OF MARLBORO, MASSACHUSETTS, ASSIGNOR TO KOEHLER MANUFACTURING COMPANY, OF MARLBORO, MASSACHUSETTS, A CORPORATION OF MASSACHUSETTS

STORAGE BATTERY

Application filed December 5, 1927. Serial No. 237,641.

This invention relates to the construction and manufacture of storage batteries.

It is the chief object of the invention to increase the reliability and reduce the manufacturing expense of batteries of this type. The invention aims especially to reduce the liability of internal short circuiting of the plates by the sediment which collects in the battery casing, and to improve the terminal construction with a view to preventing leakage of acid or acid fumes around the terminals and facilitating the mounting of them in the battery casing and the assembly of the battery parts.

The nature of the invention will be readily understood from the following description when read in connection with the accompanying drawings, and the novel features will be particularly pointed out in the appended claims.

In the drawings,

Figure 1 is a perspective view, partly in cross-section, showing a battery constructed in accordance with this invention;

Fig. 2 is a vertical, cross-sectional view on a larger scale showing the terminal construction;

Figs. 3 and 4 are vertical, cross-sectional views showing steps in the process of mounting the terminal in the battery casing;

Fig. 5 is a cross-sectional view through the upper part of the casing;

Figures 6, 7:
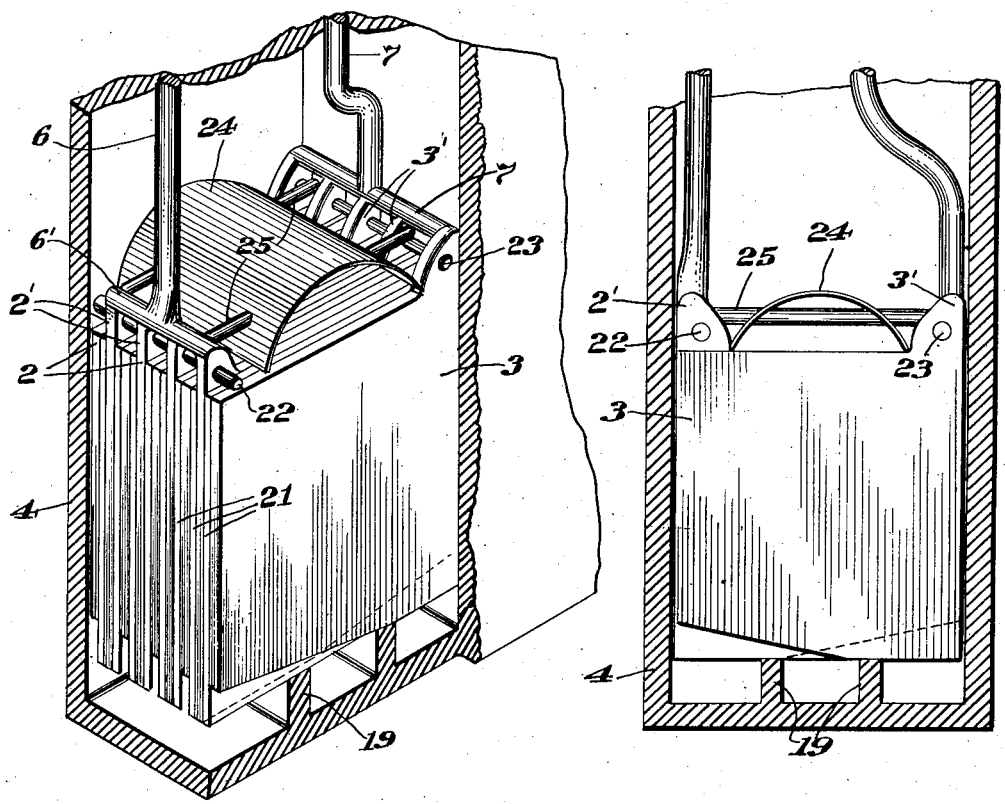
Fig. 6 is a perspective view, partly in section, showing the internal construction of a battery embodying features of this invention.
Fig. 7 is a vertical sectional view, partly in elevation, of the construction shown in Fig. 6.

The drawings show the invention as applied to a battery of the type used in electric lanterns, although it will be obvious that the invention is equally applicable to other types of batteries. The construction illustrated comprises two sets of plates 2 and 3 of opposite polarities, the individual plates of the two series being mounted in alternating relationship in the lower part of a casing which comprises a jar or body portion 4 closed by a casing top or cover 5. These parts may be of any suitable construction.

An important feature of this invention resides in the construction of the terminals and the method of mounting them in the casing. Preferably the casing top 5 is made of hard rubber or vulcanite, and the leads 6 and 7 from the two sets of plates 2 and 3, respectively, are extended upwardly and secured firmly in terminals 8 and 9 which are anchored in the top 5. Referring to Fig. 2 it will be seen that the terminal 8 consists of a tubular sleeve through which the lead 6 extends and to which it is fused at the point 10. The lower part or shank 12 of this sleeve is screw threaded into the casing top 5.

While the terminal 8 could be assembled in the top 5 by providing a threaded cavity in said top and threading the terminal into it, I prefer to use the process illustrated in Figs. 3 and 4. According to this method the terminal 8, which is made of lead or some other soft metal, is inserted in a socket or aperture 13 in the hard rubber casing member 5, the socket being of such dimensions that it will loosely receive the shank 12 of the terminal with the shoulder 14 resting on the upper surface of the top 5. Next a tapered mandrel 16 is driven through the terminal 8 and expands the shank 12 sufficiently to embed the rings or threads firmly in the walls of the aperture 13. If desired the top 5 may be heated somewhat to facilitate this embedding action and to avoid any possibility of cracking the top. Due to the fact that the terminal 8 is made of lead, or some equivalent material, the expanding operation is performed quite easily. The terminal 9 is exactly like the terminal 8 and is mounted in the top in the same manner.

According to the preferred process of assembling the battery units, the two sets of plates 2 and 3 are placed in the main body 4 of the casing, and the top or cover 5, with the terminals 8 and 9 mounted in it, is then slipped into the upper end of the casing part 4 and rested on the shoulder 17, the leads 6 and 7 being slipped through their respective terminals 8 and 9. The portions of the leads 6 and 7 which project above the ends of the terminals are next cut off so that they are substantially flush with the upper ends of the terminals, and each lead is then fused to its respective terminal by a lead burning process or soldering. This makes a good electrical contact between each lead and its terminal, provides a construction which is strong mechanically, and effectually prevents leakage of acid or acid fumes around the terminals.

At any desired point in the process after the top 15 has been placed in the jar 4, sealing compound may be poured into the crease between the edges of the top 5 and the upper margin of the jar to close this space.

It is usual in storage batteries to rest the lower edges of the plates on bridges, such as those indicated at 19, Fig. 1, in order to provide a space below the plates to receive the "mud" or sediment which accumulates in the bottom of the casing as the battery is used. There is a tendency in portable batteries for this mud to collect in larger quantities at the opposite sides of the battery than at the central portion, and it may, after a time, rise sufficiently to short circuit the plates or be washed up between the corners of the plates where it will have this effect. According to this invention, therefore, the lower corners of the plates are cut away at their ends, as shown at 20—20, Fig. 1, so that a greater mud-clearance is provided at the ends of the plates than at the central portions of their lower edges.

In the construction shown in Fig. 1 each plate is cut away at both ends. Figs. 6 and 7 show a construction which is preferable under some circumstances and in which the lower edge of each plate is cut away at one end only. In other words, each plate has one upright edge longer than the other, and the plates are placed in an alternating relationship, all the plates of one set being cut away at one end, while those of the other set are cut away at the opposite end. This relationship is clearly shown in Figs. 6 and 7. The separators 21 are not cut away at all. In this construction, therefore, each set of plates bears on one of the bridge pieces 19 and not on the other, but the two sets do not bear on the same bridge piece. The separators, however, bear on both bridge pieces. Such an arrangement has the advantage of providing a longer leakage space between the lower edges of adjacent plates. If any mud or sediment collects on the lower edges of the plates or separators when the battery is turned upside down, a greater accumulation is necessary in order to short circuit the plates than otherwise would be required.

In this construction, also, a novel arrangement is provided for preventing the displacement of the separators. It will be observed that each of the plates 2 is provided with an ear or lug 2' which projects upwardly above the main portions of the plates, and that the plates 3 have similar ears or lugs 3'. These lugs are perforated and an insulating rod 22 projects through the holes in the ears 2', while a similar rod 23 projects through the holes in the ears 3'. These insulating rods may be made of wood, hard rubber, or the like, and they lie immediately above the upper edges of the separators so that they prevent the separators from becoming displaced in an upward direction.

Preferably a curved guard 24 made of hard rubber or other suitable sheet material is placed on the top of the battery plates and is held in this position by two rods 25 which extend through holes formed in the curved plate near its opposite edges and which connect the respective plates of each set and to which the leads 6 and 7, respectively are joined. This plate 24 performs the functions of a baffle to hold down or deflect the spray created in charging, and prevents this spray from being thrown upwardly against the non-spilling device 26, Fig. 1, with which the battery is provided.

It will be observed that the invention provides a battery construction in which the liability of internal short circuiting is materially reduced and which has a simple but unusually satisfactory terminal construction. A superior method of assembly has been provided, both in the mounting of the terminals in the casing and also in the securing of these terminals to the leads from the plates.

While I have herein shown and described preferred embodiments of the invention, it will be understood that the invention may be embodied in other forms and that variations in the process described are permissible without departing from the spirit or scope of the invention.

Having thus described my invention, what I desire to claim as new is:

1. That improvement in methods of mounting terminals in battery casings made of insulating material which consists in providing a terminal having projections on its outer surface, positioning said terminal in an aperture in the casing, and then expanding the terminal sufficiently to embed said projections firmly in the walls of said aperture.

2. That improvement in methods of mounting terminals in battery casings made of insulating material which consists in providing a tubular externally threaded terminal of soft metal, positioning said terminal in an aperture in the casing, and expanding the terminal sufficiently to embed the threads firmly in the walls of said aperture.

GRANT WHEAT.